Re. 25216

Feb. 4, 1958     W. W. KENNEDY     2,821,898

AIR DISTRIBUTION OUTLET

Filed Aug. 16, 1955     8 Sheets-Sheet 1

INVENTOR.
Walter W. Kennedy
BY
ATTORNEYS

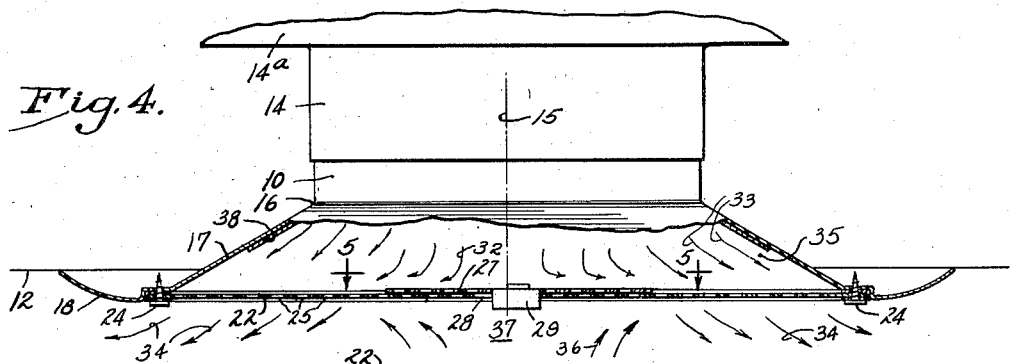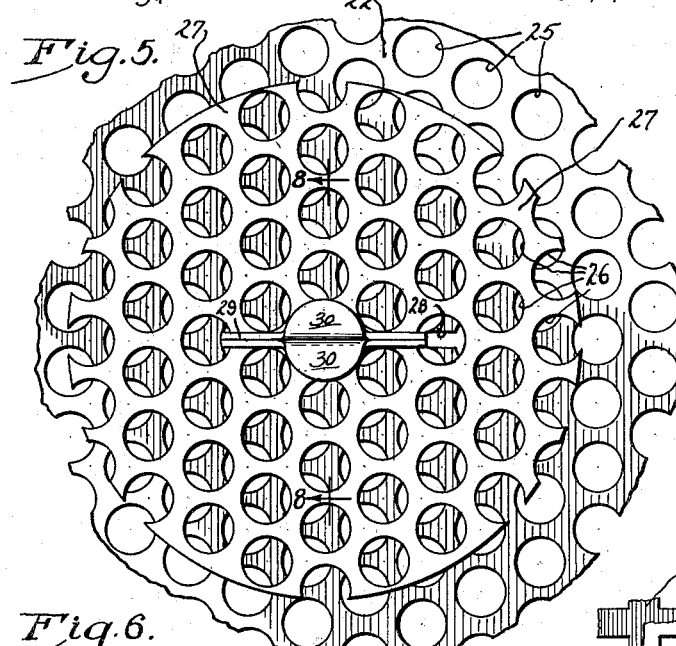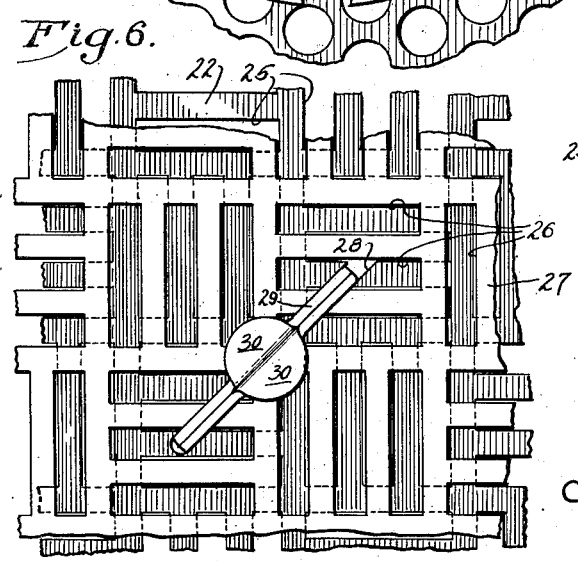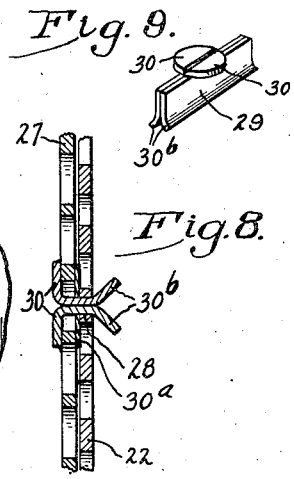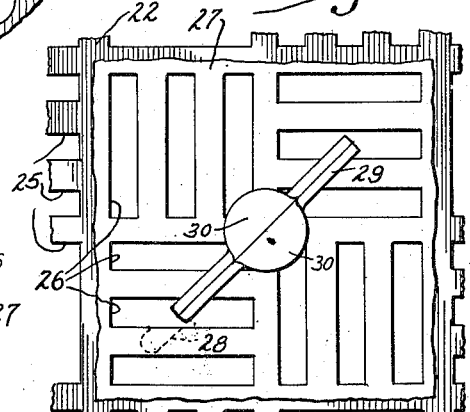

Feb. 4, 1958 W. W. KENNEDY 2,821,898
AIR DISTRIBUTION OUTLET
Filed Aug. 16, 1955 8 Sheets-Sheet 3

INVENTOR.
Walter W. Kennedy
BY
ATTORNEYS

Feb. 4, 1958 W. W. KENNEDY 2,821,898
AIR DISTRIBUTION OUTLET
Filed Aug. 16, 1955 8 Sheets-Sheet 4

INVENTOR.
Walter W. Kennedy
BY
ATTORNEYS

Feb. 4, 1958 W. W. KENNEDY 2,821,898
AIR DISTRIBUTION OUTLET
Filed Aug. 16, 1955 8 Sheets-Sheet 5
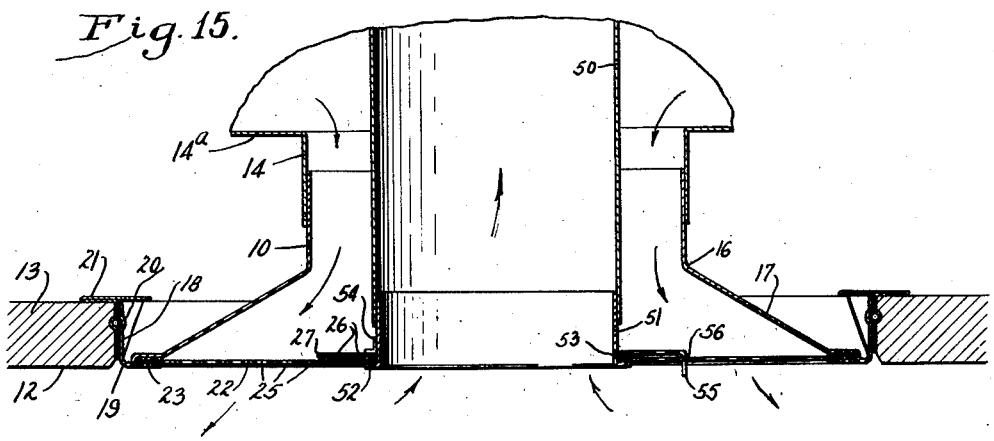
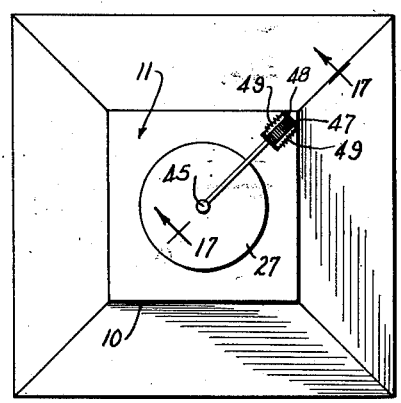
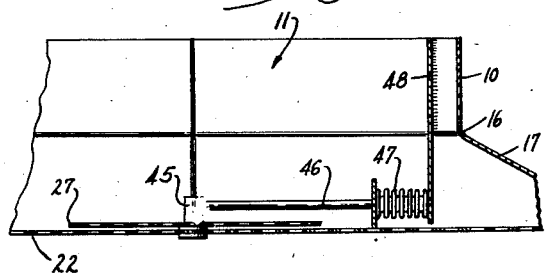
INVENTOR.
Walter W. Kennedy
BY
ATTORNEYS Feb. 4, 1958 W. W. KENNEDY 2,821,898
AIR DISTRIBUTION OUTLET
Filed Aug. 16, 1955 8 Sheets-Sheet 6

INVENTOR.
Walter W. Kennedy
BY
Carlson, Pitzner, Hubbard & Wolfe
ATTORNEYS

Feb. 4, 1958  W. W. KENNEDY  2,821,898
AIR DISTRIBUTION OUTLET
Filed Aug. 16, 1955  8 Sheets-Sheet 7

INVENTOR.
Walter W. Kennedy
BY
Carlson, Pitzner, Hubbard & Wolfe
ATTORNEYS

Feb. 4, 1958 W. W. KENNEDY 2,821,898
AIR DISTRIBUTION OUTLET
Filed Aug. 16, 1955 8 Sheets-Sheet 8
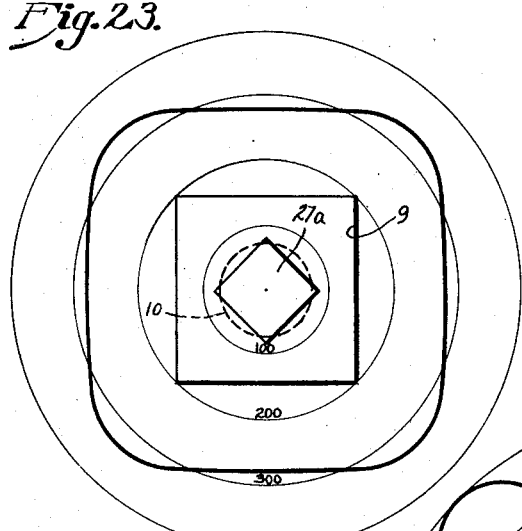
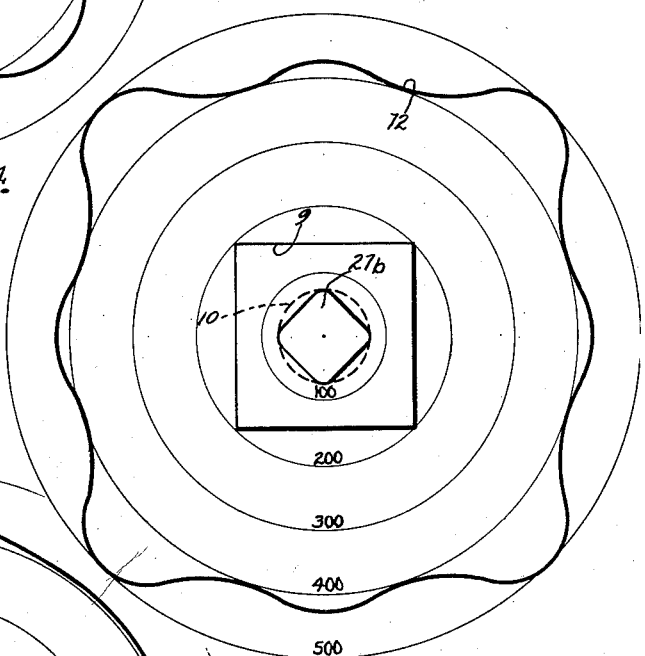
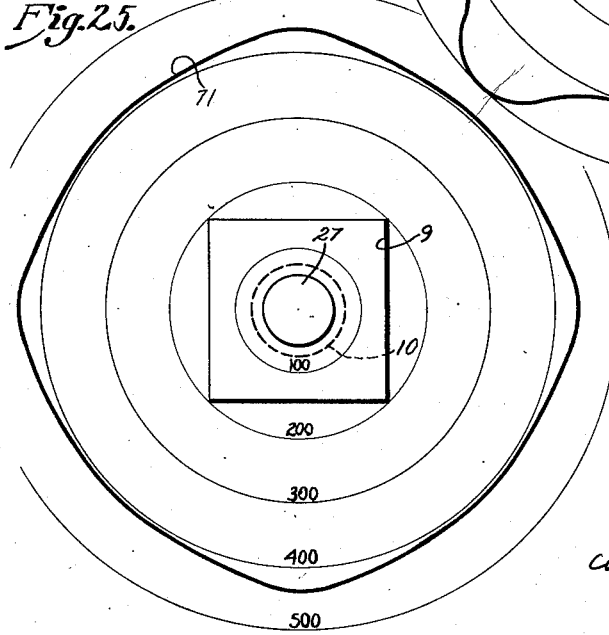
INVENTOR.
Walter W. Kennedy
BY
ATTORNEYS

United States Patent Office 2,821,898
Patented Feb. 4, 1958

2,821,898

AIR DISTRIBUTION OUTLET

Walter W. Kennedy, Rockford, Ill., assignor to Barber-Colman Company, Rockford, Ill., a corporation of Illinois Application August 16, 1955, Serial No. 528,670

18 Claims. (Cl. 98—40)

This invention relates to outlets for use in air conditioning systems to control the manner of distribution of air into a room.

A general object is to provide an outlet which may be adjusted easily to vary the direction, pattern, or volume of the discharged air, which produces a high aspirating effect, and which has a generally flat discharge face that may be disposed substantially flush with the room wall and thus blended into an acoustical tile or other block type construction.

A more detailed object is to employ a perforated plate for the face of the outlet combined in a novel manner with a deflector acting on the incoming air stream to control the discharge through the plate perforations and produce desired angles of discharge of the air into the room.

A third object is to correlate in a novel manner the dimension of the inlet or neck of the unit with the thickness and free air area of the perforated face plate to enable a centrally located deflector to be effective in exercising the desired control over the direction of the air discharge into the room.

A fourth object is to provide an outlet of the above character in which different angles and patterns of discharge of the air are achieved by a novel construction and positioning of the deflector.

A fifth object is to provide a novel construction of the deflector which effectually avoids discoloration of the exposed face of the perforated plate by contact with room aspirated air even though the air delivered through the unit is at a very low temperature.

A sixth object is to correlate the shape of the deflector with that of the inlet and outlet of the unit so as to vary the velocities attained in the discharged air stream at different points angularly spaced and outwardly beyond the periphery of the outlet opening.

A seventh object is to provide within the unit a novel arrangement of vanes for controlling the volume of air delivered through the unit.

An eighth object is to provide a novel means for varying the pattern of the air discharge automatically in accordance with changes in the condition of the incoming air.

A ninth object is to adapt the unit for the return of air from the room through the unit itself.

Other objects and advantages of the invention will become apparent from the following detailed description taken in connection with the accompanying drawings, in which Figure 1 is a fragmentary cross sectional view of the wall of a room equipped with an air distribution unit embodying the novel features of the present invention, the unit being shown as a section taken along the line 1—1 of Fig. 2.

Fig. 4 is a view similar to Fig. 1 showing a different position of adjustment.

Fig. 5 is an enlarged fragmentary view of a portion of the face plate of the unit.

Figs. 6 and 7 are views similar to Fig. 5 showing modified shapes of the face plate perforations and illustrating different positions of the parts.

Fig. 8 is a fragmentary sectional view taken along the line 8—8 of Fig. 5.

Fig. 9 is a perspective view of one part of the deflector member.

Fig. 15 is a fragmentary sectional view similar to Fig. 1 showing a modification.

Fig. 16 is a plan view of a modification of the unit shown in Fig. 1.

Fig. 17 is a fragmentary sectional view taken along the line 17—17 of Fig. 16.

Figure 1:
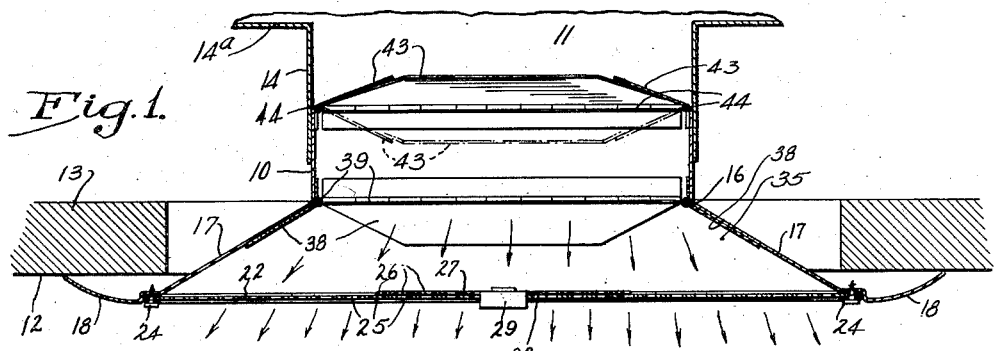

Figs. 23, 24, and 25 are similar charts for different arrangements and shapes of the deflector inlet.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

Figure 10:
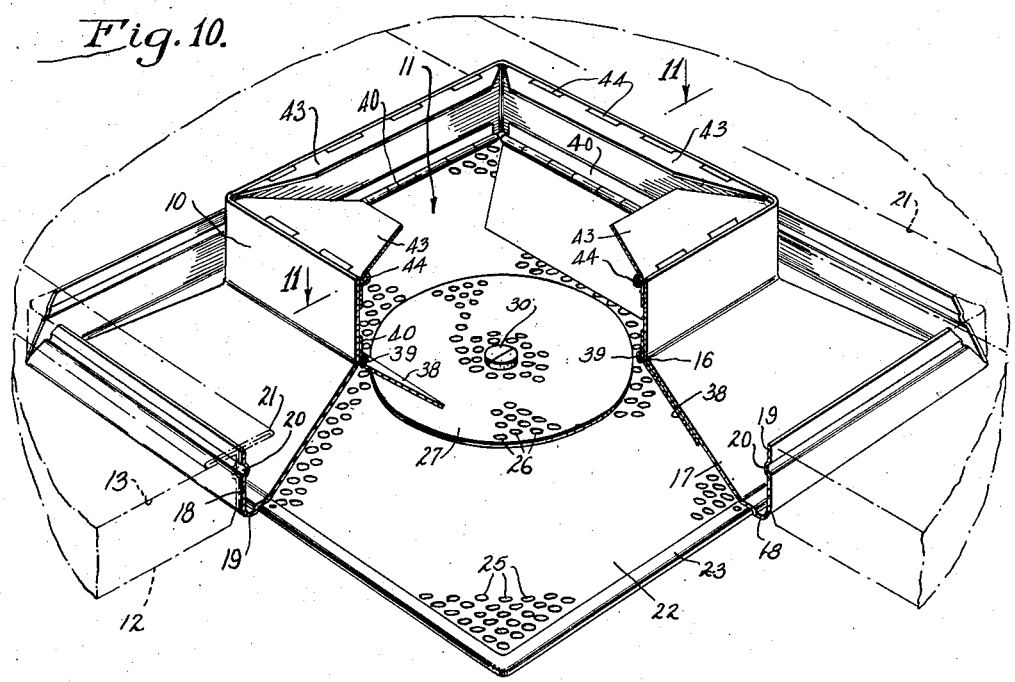
Fig. 10 is a fragmentary perspective view of the improved unit looking at the top thereof.
Figure 11:
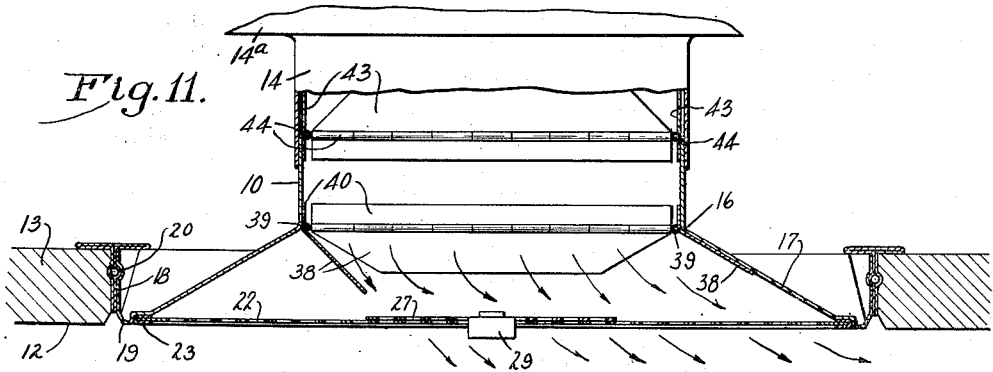
Fig. 11 is a section taken along the line 11—11 of Fig. 10.

The improved distribution unit includes a tubular casing having a collar 10 at one end defining an inlet 11 and flaring at the opposite or outlet end which is adapted to be mounted in the ceiling 12 and, as shown in Figs. 10 and 11, may be of the same size and shape as the tile or blocks 13 commonly used in acoustical walls. The collar 10 is adapted to telescope within and be connected to the branch 14 of an air supply duct 14ᵃ.

In the forms shown in Figs. 1, 2, 10, and 15, the collar 10 is square in cross section and the ends of its flat sides merge at 16 with the casing walls 17 which are flat all the way to the discharge edge and form a pyramidal frustum having a slope of about 60°. The walls 17 terminate in flanges 18 which may, if desired, overlap the adjacent parts of the ceiling as shown in Figs. 1 and 4, and define edges of a rectangular outlet opening 9. As an alternative, the edge portion of the flange may be bent upwardly at right angles as indicated at 19 in Figs. 10 and 15 and sized to fit between four of the ceiling or wall blocks 13. In this case, the flange edges 18ᵃ are formed with longitudinal ribs 20 which form grooves receiving the ribs on the usual T-bars 21 that are used to support the adjacent ceiling blocks.

Figure 2:
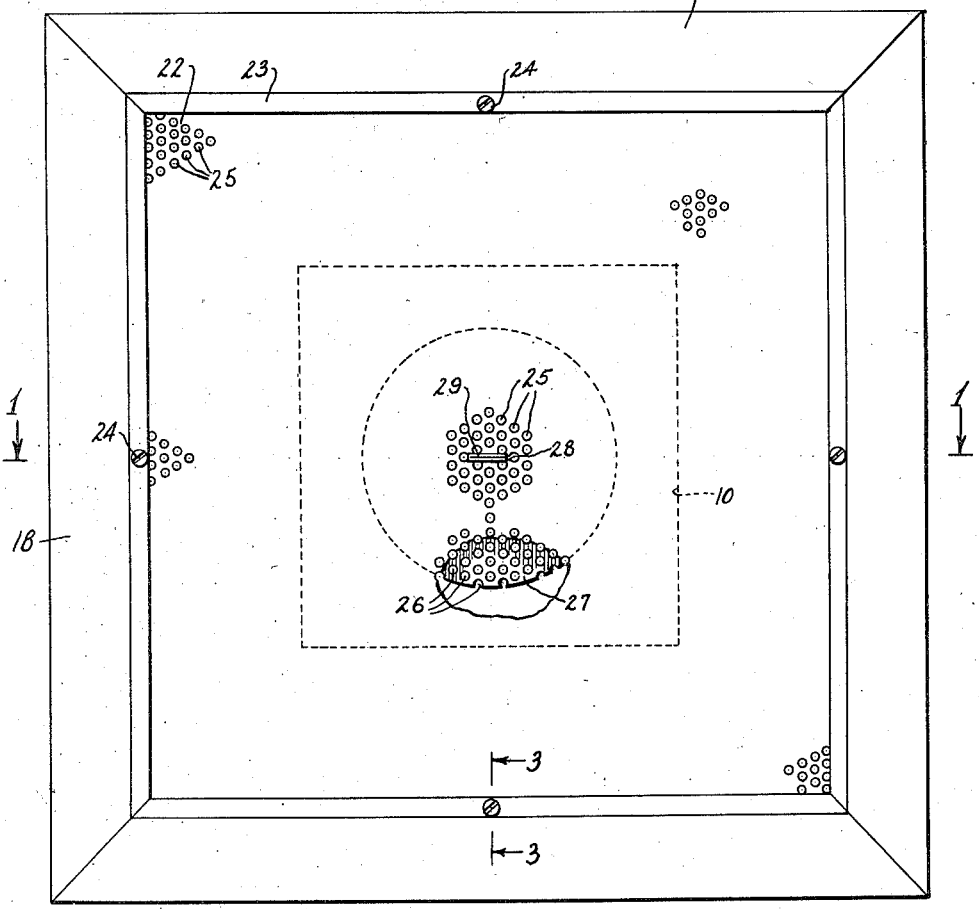
Fig. 2 is a face view of the unit.
Figure 3:
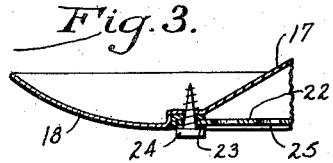
Fig. 3 is an enlarged fragmentary section of a part of Fig. 1.

The inner peripheral portion of the flanges 18 or 18ª is depressed slightly to provide a seat for receiving the edges of a flat perforated face plate 22 which is substantially flush with the outer face of the flange 18 and may be enclosed at its edges by a narrow frame 23 secured to the flange by screws 24. The perforations 25 in the plate 22 are relatively small and of equal size and, to provide the necessary impingement areas for causing lateral spreading of the discharged air streams as will be described later, the perforations are spaced apart uniformly and correlated in size with the plate thickness so as to permit the free flow of air outwardly and at large angles relative to the axis 15 as indicated by the arrows in Fig. 4. The shape of the holes is largely a matter of design preference. For example, they may be circular as shown in Figs. 2, 5, and 10 or of any other desired shape such as the elongated slots 25ª shown in Figs. 6 and 7 arranged in groups with the slots of adjacent groups perpendicular to each other.

The invention aims to controllably vary the pattern of the air discharged through the perforations of the outlet by correlating numerous factors including the thickness of the face plate 22, the free area of the plate, and the size of the uncovered plate area in relation to the effective area of the inlet 11. Preferably, the face plate is less than .035 of an inch thick and the free air area therethrough, that is, the total area of the holes 25, is between 35 and 55 percent of the total area of the plate. The area of the plate should be at least four times the free area of the inlet 11 at its smallest section.

With a unit thus proportioned, the desired control over the air discharge pattern is achieved through the use of a deflector member 27 smaller in size than the inlet 11 and disposed within the flared portion of the casing beyond the end of the inlet to intercept part of the air stream delivered through the latter, the deflector being perforated by holes 26 (Fig. 5) and 26ª (Fig. 6) and adjustably mounted if it is desired to vary the amount of such interception after installation in service use. Preferably the deflector member takes the form of a thin disk lying adjacent the face plate 22 and movable relative thereto to bring the holes 26 or 26ª therein into varying degrees of register with the perforations 25 of the face plate. In the forms shown in Figs. 5 and 6, the holes are of the same size and shape as the perforations 25 and 25ª in the face plate and are equally spaced over the entire area of the disk.

Figure 13:
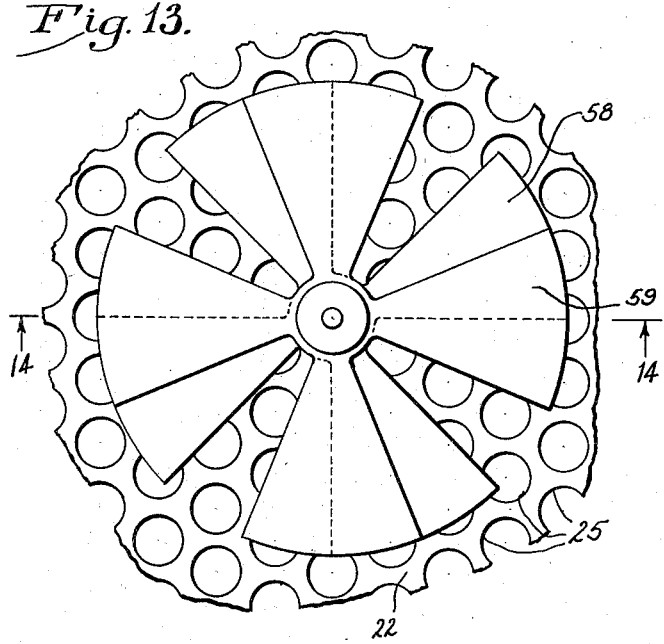
Fig. 13 is a view similar to Fig. 5 showing a modified form of the deflector member.

While the disk may be rotatably mounted on the face plate and turned relative thereto to obtain different areas of interception of the incoming air stream as shown in Figs. 13 and 15, it is preferred to adjust the disk edgewise in a straight line. To this end, the face plate 22 is formed with an elongated slot 28 (Figs. 5, 6, and 8) loosely receiving a bar 29 herein comprising two strips having bent over flanges 30 which are welded or otherwise secured against the top of the deflector disk with a spacer 30ª separating the two so as to permit free edgewise shifting of the disk.

The other edges of the strips project through the slot 28 and are spread apart as indicated at 30ᵇ to provide a handle which may be grasped to shift the bar and disk along the slot. The bar is thus secured to the disk but slidable with a close friction fit along the slot 28 which is long enough to permit the holes and perforations on the disk and face plate to be brought into full register (Fig. 1), any desired degree of partial register (Fig. 5), or to be fully covered (Fig. 6). When circular holes and perforations are employed as illustrated in Figs. 1, 5, and 10, the slot 28 is extended diametrically of one row of holes in the respective plates. In the case of the slotted pattern shown in Fig. 5, the slot 28 extends diagonally of the elongated perforations 25 and 26 which are substantially covered in the position shown in Fig. 6. As the bar 29 is slid upwardly and to the right, full register of the perforations and holes is attained when the bar reaches the end of the slot as shown in Fig. 7.

For certain patterns of distribution of the discharged air, the deflector 27 may be circular in shape and is rounded and, for the square faced outlet shown, is related in size to that of the inlet 11. When circular in shape as shown in Figs. 2, 5, and 10, the diameter of the disk is more than half the minimum transverse dimension of the inlet but substantially less than the transverse dimension. With the diameter of the circular disk equal to two-thirds of the length of one side of the square inlet as shown in Fig. 1, the effective cross section of the inlet is 2.8 times the area of the disk.

With the face plate 22 perforated to provide a large free area as described and the deflector 27 disposed opposite and of substantially smaller area than the inlet 11, it will be apparent that the total area of the plate holes 25 or 25ª surrounding the deflector is substantially greater than the cross-sectional area of the inlet 11. As a result, the entire volume of air delivered through the inlet will flow through the unit without a change in its direction before contacting the face plate and without loss of its velocity or the creation of a static pressure within the unit. Thus, the deflector 27 may be used in accordance with the present invention to govern the direction of the air discharge from the face of the perforated plate 22 so as to produce various desired patterns for effective distribution of the air within the room in which the unit is eventually installed.

The unique manner in which the casing, the perforated face plate, and the adjustable deflector coact to produce various air discharge patterns will now be described, it being first assumed that the deflector is shifted to the position shown in Fig. 4 to bring the perforations 25 and the holes 26 out of register and thus close the central part of the face plate against the flow of air therethrough. In this position, the impingement area presented to the air stream delivered through the inlet 11 will be a maximum.

As the central portion of the advancing air stream encounters the closed disk, it will be deflected laterally and outwardly and, since an air stream does not bounce backwardly, the flow will be radially and outwardly in all directions along the inner surface of the disk as indicated by the arrows 32. Such outward lateral flow into the outer annular portion of the air stream as indicated at 33 will bend the latter outwardly as it passes through the perforations 25 as indicated at 34. The outward bending is further increased as a result of the low pressure region which develops at 35 within the casing due to the outward flaring of the walls 17 and the fact that the latter are of straight contour all the way to the edge of the outlet. As a result of these two actions (the low pressure at 35 and the outward spreading of the central part of the air stream by the deflector 27), the four blankets of air flowing downwardly along the flat walls 17 will be bent upwardly as they enter the room and will fan outwardly at a relatively small angle to the ceiling. Such wide spreading of the air stream is particularly desirable in cooling systems.

The unit conditioned as above described is particularly effective in producing a strong aspirating action below the unit as the air stream advances into the room, that is, to cause mixing of incoming cool air with the room air so as to avoid exposure of the occupants to objectionable downwardly directed cold drafts. Since the central part of the fact plate is now closed, and the air is discharged in a tubular outwardly flaring stream, there will be a relatively large region of low pressure immediately below the center of the unit. Room air drawn into this region as indicated by the arrows 36 will be exposed to the interior of the incoming stream and will mix rapidly with the latter. Also, due to the perforated character of the face plate, the incoming air will be divided into a multiplicity of small streams at the points of entry into the room. By aspiration, air from the room will be drawn laterally and in between these streams and mixed quickly with the latter owing to the large peripheral areas thereof.

The unit above described may, simply by adjustment of the deflector 27, be adapted for use in a heating system where it is usually desirable to direct most of the air downwardly in a substantially vertical direction. For this purpose, the disk 27 may be shifted to the position shown in Fig. 1 in which the holes 26 are in full register with the perforations 25 in the face plate. As indicated by the arrows, air will flow vertically down through all of the holes in the disk and very little of the above described deflecting action of the latter will be exerted. At the same time, the low pressure in the region 35 will not, while acting alone, produce appreciable outward bending of the peripheral part of the air stream; consequently there will be little spreading of the stream as it is discharged into the room.

The conditions above described and illustrated in Figs. 1 and 4 represent the extreme limits of the range through which the pattern of the discharged air may be varied to suit the requirements in various air conditioning installations. Any desired variation of the pattern within this range may be achieved by adjusting the deflector to the proper intermediate position. In such a case, the proportion of the incoming air which is delivered vertically will correspond to the amount of the uncovering of the central perforations 25. Similarly, the deflecting action of the disk 27 and therefore the degree of spreading of the discharged air will decrease progressively as the perforations are uncovered. As a result, the spread and the throw of the discharged air stream may be varied to suit the prevailing service conditions including temperature of the delivered air, ceiling height, room size, etc.

The invention also contemplates the provision of novel means arranged within the casing for selective adjustment to vary the direction of the discharged air stream and also the volume of air delivered through the outlet. In the form shown, this means comprises four generally flat vanes or baffles 38 of trapezoidal shape disposed within the inlet 11 with their longer edges substantially coextensive with the sides of the collar 10 and joined to the latter through hinges 39 (Figs. 10 and 11). The latter may be of the so-called pintle type with one set of eyes formed at the edge of vanes 38 and the other set bent from a strip 40 spot welded or otherwise secured against the collar 10 so as to locate the hinge axes near and along the lines 16 of the intersection of the collar and the respective walls 17 so that the baffles may be swung downwardly and outwardly to inactive positions against the inner sides of the walls 17 as shown at the right in Fig. 10. By closely fitting the hinge parts, enough friction may be developed to maintain any adjusted position of the individual baffles. The latter are shorter than the vertical space between the hinges 39 and the face plate 22, but long enough to overlie the extreme outer edge of the deflector 27 when inclined at about forty-five degrees as shown in Fig. 11.

In this position of the baffle 38, the corresponding perforated side portion of the face plate, although not closely covered by the baffle, is nevertheless blocked effectually against any substantial flow of air therethrough. Thus, if it is desired to confine the outward flow of the air to two directions from opposite sides of the outlet, the baffles 38 corresponding to these directions are left in the inactive positions against the walls 17 as in the case of the upper and lower baffles in Fig. 10 while the other two baffles are swung into active position as shown in Fig. 10. The latter baffles effectually block off the outward flow of the air from their corresponding sides of the outlet and a two way discharge of the air is attained from the other two sides of the outlet. If the air discharge is to be in only one direction, the other three of the baffles are swung to active position. Or, if a three direction discharge is desired, only the baffle corresponding to the other direction is raised to active position, the other three being left inactive and against the walls 17.

The baffles 38 are most effective in their blocking or masking action when disposed at about 45° to the face plate as in the case of the right and left hand baffles shown in Fig. 10. If only a partial blocking action in one or more directions is desired, the corresponding baffles may be swung only part of the distance between the inactive and fully effective positions for example as shown in Fig. 11. Thus a lesser outward spreading of the discharged air stream may be achieved in the directions thus selected.

Figure 12:
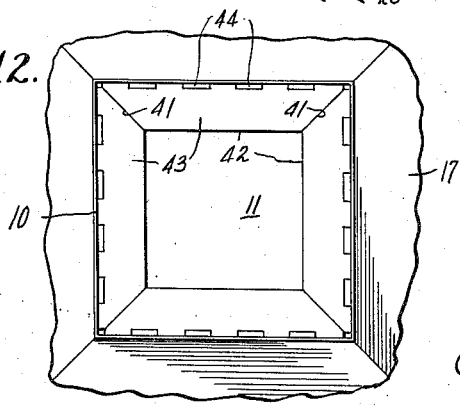
Fig. 12 is a fragmentary plan view of Fig. 10.

The baffles 38, when mounted as described above, may be utilized to perform the additional function of regulating the volume of air delivered through the outlet without detracting from the impinging action of the deflector 27 in producing outward spreading of the air stream. For this purpose, all of the baffles or vanes are swung inwardly and upwardly beyond the vertical and toward the horizontal positions shown in Fig. 12, in which the greatest volume reduction is produced. In this position, the inclined ends 41 of the vanes lie close to each other at miter corners and the inner or free edges 42 cooperates with each other to define the inlet 11 which, although of reduced area, remains centered with respect to the collar 10, the face plate 22, and the deflector disk 27. The latter thus operates as described above in controlling the pattern and the throw of the discharged air stream.

The effective area of the inlet 11 may be increased from this minimum cross section by further opening of the baffles 38 in unison. This is done by swinging the vanes downwardly from the horizontal positions until the desired rate of flow through the inlet is attained.

For installations where it is desired to vary both the pattern and the volume of the discharged air, a second set of vanes 43 (Figs. 10 and 11) similar to the baffles 38 may be mounted on the collar 10 and spaced above the baffles 38. As in the case of the baffles 38, the vanes 43 are of trapezoidal shape and project from hinges 44 that may be secured to the sides of the collar 10 along the upper edge of the latter. These vanes may lie in inactive vertical position against the sides of the collar 10 or be swung into the inlet as shown in Figs. 1 and 10. The effective area of the inlet may thus be reduced according to the volume of air desired to be delivered through the outlet. By positioning the various vanes 43 at the same angles relative to the horizontal, the inlet opening defined by their inner free edges will always be centered properly relative to the axis of the unit and the deflector 27 and the discharged air will be distributed uniformly around the outlet.

The damper vanes 43, when used to reduce the volume of air delivered through the unit, do not detract from the versatility of the unit in providing for long or short throws of the air stream. When a short throw is desired, the vanes 43 would be swung upwardly and away from the face plate in order to obtain the desired reduction in the volume of air delivered. In this position, the air stream flowing through the inlet of reduced area expands considerably within the flared portion of the casing and thus strikes the deflector 27 at a lower velocity. The outward throw of the air into the room is reduced correspondingly.

When a long throw at reduced volume is desired, the vanes 43 are swung inwardly to reduce the area of the inlet but are inclined downwardly as shown in phantom in Fig. 1. The free ends of the vanes then cooperate to form an orifice disposed close to the deflector 27 against which the air impinges at relatively high velocity. This, as described above, increases the outward flow of the discharged air stream.

The distribution unit above described lends itself readily to adjustment automatically with changes in operating conditions, for example, the delivered air temperature when the conditioning system is changed from heating to cooling operation and vice versa. For this purpose, the deflector member 27 is slidably mounted on the face plate as described above and connected, preferably through an upstanding lug 45 (Figs. 16 and 17) near its center to one end of a rod 46 whose other end is coupled to the movable end of a bellows 47. The other end of the latter may be secured to a bracket 48 rigid with the casing of the outlet. Contractile springs 49 stretched between the bracket and the movable end of the bellows 47 tend to contract the latter as permitted by the prevailing volume of the expansible fluid filling the bellows.

The bellows is disposed in the path of the air flowing through the unit and dimensioned to hold the deflector disk in the position shown in Fig. 7 and fully uncovering the perforations 25 when warm air such as is used for heating is being delivered through the outlet. The air stream is thus discharged downwardly through all parts of the face plate (Fig. 1) as is described during the heating season. When cold air is supplied through the outlet, the bellows 47 contracts and shifts the deflector 27 to fully cover the perforations 25 (Fig. 6) and thus the deflector is most effective in producing maximum outward spreading of the air as it enters the room. The perforations 25 may be partially uncovered at intermediate temperatures so as to produce, if desired, a discharge pattern which varies progressively with the changes in the temperature of the air flowing through the unit.

Sometimes it is desirable to utilize the unit above described as a return air inlet as well as a conditioned air supply outlet. This may be accomplished without detracting from the intended action of the deflector by an arrangement such as that shown in Fig. 15 in which a return air duct 50 is extended downwardly through the collar 10 with its open lower end terminating at a central opening in the face plate 22ᶜ. In this instance, the lower end of the duct 50 takes the form of a cylindrical collar 51 telescoping in and journaled on the duct proper and having a narrow bottom flange 52 underlying the face plate. The perforated deflector 27ᶜ is a flat ring held against a washer 53 on the face plate 22ᶜ by a plurality of lugs 54 rigid with the collar 51. A lug 55 on the deflector projects through an arcuate slot 56 in the face plate and is accessible below the latter to permit turning of the deflector to vary the uncovering of the perforations 25ᶜ in the same manner as with the slidable deflector disks above described. A decorative covering of suitable design may be applied to the lower end of the return air duct.

As before, the area of the deflector 27ᶜ is made sufficiently smaller than the area of the ring-like inlet between the collar 10 and the return duct 50 to insure that the total area of the uncovered perforations in the plate 22 is more than the area of the inlet. In this way, the air stream may flow directly through the unit without change in its direction or loss of its velocity which is utilized in the manner described above in controlling the resultant angle of discharge of the air from the face of the plate 22.

Figure 14:
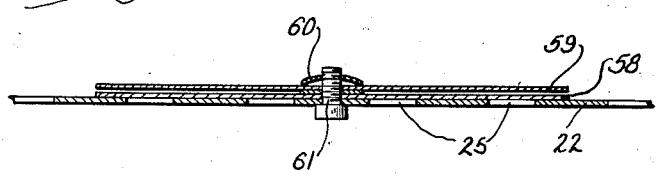
Fig. 14 is a fragmentary section taken along the line 14—14 of Fig. 13.

Instead of employing a disk perforated by relatively small holes as described above, a deflector member of the construction shown in Figs. 13 and 14 may be used. In this case, two disks 58 and 59 of equal size and disposed one above the other are formed with imperforate segmental arms of similar width. The disk 58 is fixed to the top of the face plate 22 while the disk 59 is coupled as by a friction washer 60 to a pin 61 journaled in and projecting down through the face plate. By turning the pin, the arms 59 may be swung to positions covering the apertures between the arms 58 of the nonrotatable disk. Or, when the arms 59 overlap the arms 58, some or all of the perforations 25 intervening between the arms 58 will be uncovered, maximum opening of the perforations 25 being obtained when the arms 58 and 59 are in full register with each other. Thus, by turning the disk 59 back and forth the pattern of the discharged air may be varied the same as with the deflector construction previously described.

Figure 22:
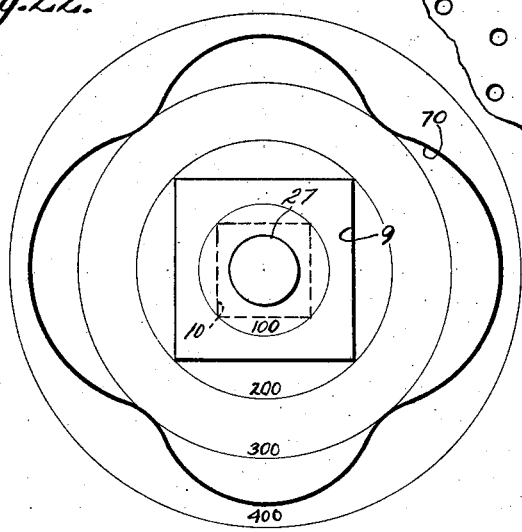
Fig. 22 is a chart showing the distribution of the air velocities around the axis of the outlet when the deflector is positioned as shown in Fig. 4.

I have discovered that the velocity of the discharged air at angularly spaced points around the outlet may be varied to produce different discharge patterns by varying the shapes of the inlet 11 and the deflector 27 in relation to each other and to the outlet opening 9. For example, when the unit is constructed and adjusted as shown in Fig. 4 with the inlet neck 10 six inches square, the outlet 9 twelve inches square, and the circular deflector 27 four and one-half inches in diameter, the velocity at an eighteen inch radius and three-fourths of an inch below the ceiling will vary as shown by the curve 70 (Fig. 22). That is to say, the velocity varies from a maximum opposite the centers of the outlet edges and a minimum beyond the corners. The total variation is not substantial being only 175 feet per minute for a flow rate through the unit of 300 C. F. M. Such a unit is well suited for installations where it is desirable to throw the air outwardly approximately equal distances in all directions.

A similarly shaped velocity pattern 71 but with somewhat less variation between the maximum and minimum velocities will be achieved as shown in Fig. 25 when the inlet neck 10 is made cylindrical instead of square and six inches in diameter.

Figure 18:
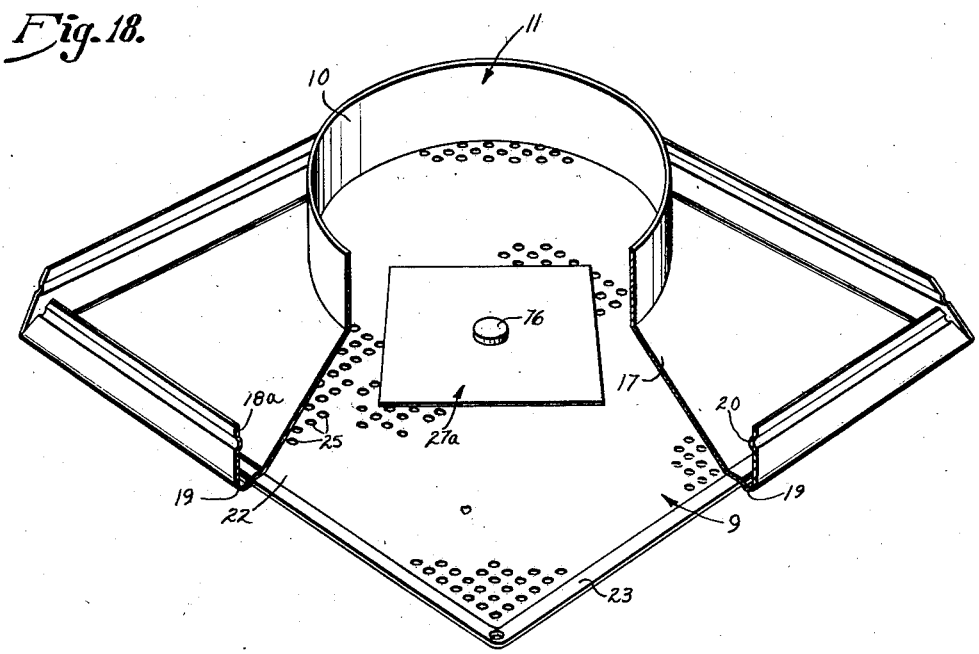
Fig. 18 is a fragmentary perspective view similar to Fig. 10 showing a modified arrangement of the inlet and deflector plate.

A unit better suited for uniform distribution of the air to all parts including the corners of a relatively small room may be formed by employing a six inch cylindrical inlet 10 in a twelve inch square outlet 9 with the deflector 27ᵃ four and one-half inches square and centered relative to the outlet axis but turned so that the corners of the deflector bisect the side edges of the outlet 9 as shown in Figs. 18 and 23. In this instance, a larger part of the corner area of the face plate 22 is uncovered and a correspondingly smaller part of the area at the center of the sides is left open. As a result, the air velocities outwardly from the corner of the outlet are increased substantially as compared to velocities opposite the centers of the outlet edges. Thus, by locating the outlet 9 with the edges paralleling the room walls, the peripheral discharge patterns achieved will cause a maximum throw of air toward the corners of the room. If, with the relationship shown in Fig. 23, the corners of the square deflector 27ᵃ are rounded off as indicated at 27ᵇ (Fig. 24), the minimum velocity opposite the centers of the outlet margins will be increased while retaining a generally square shape of the velocity pattern 72.

Figure 19:
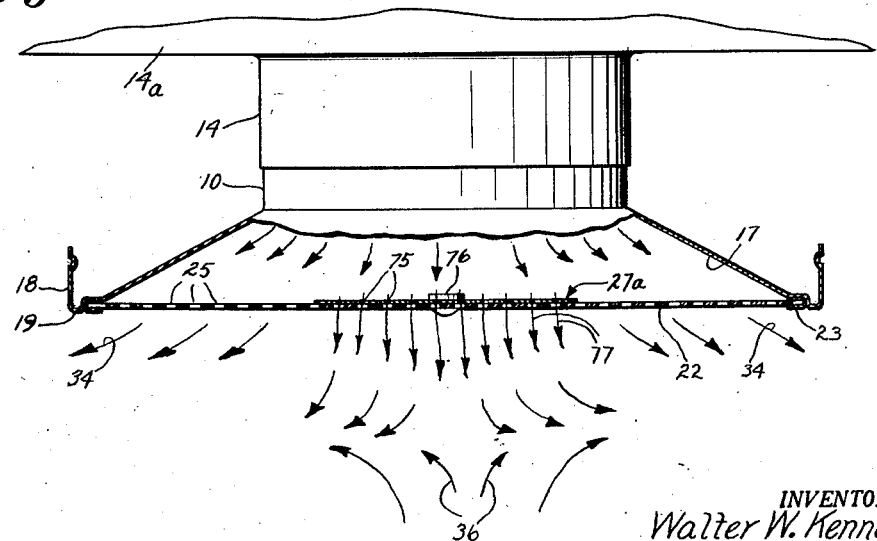
Fig. 19 is a fragmentary elevational view similar to Fig. 11 showing the pattern produced by a further modification of the deflector.
Figure 20:
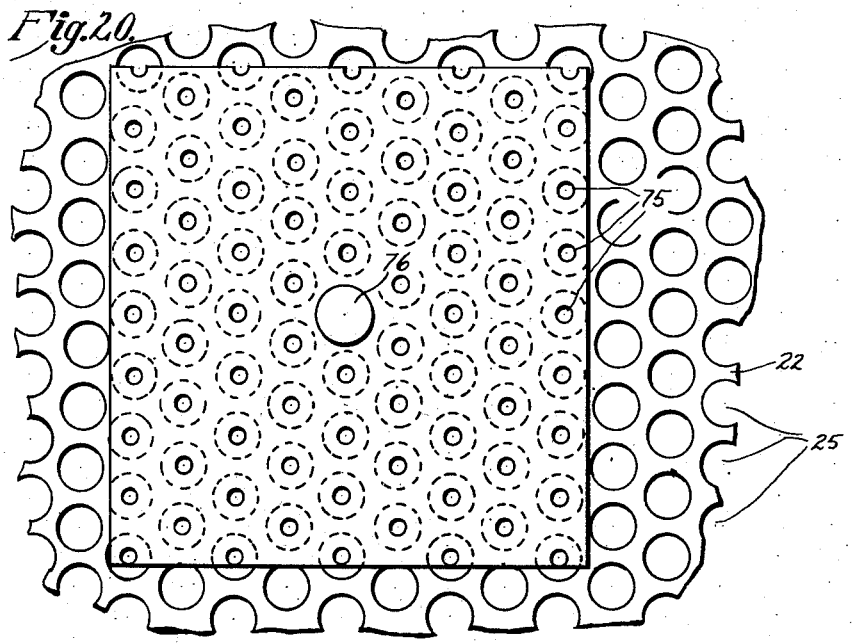
Fig. 20 is a fragmentary bottom view of Fig. 19.
Figure 21:
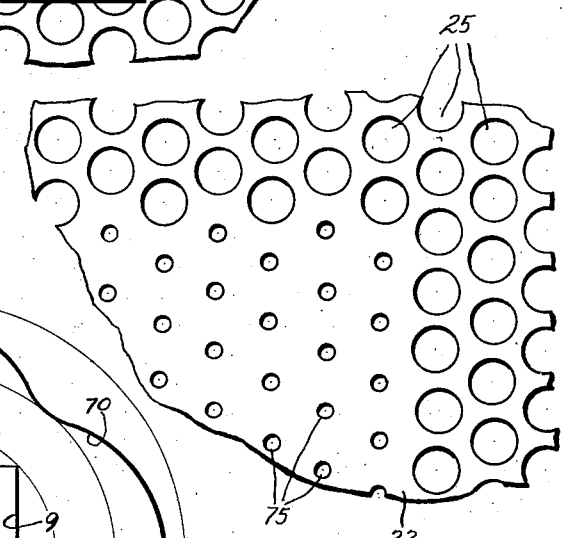
Fig. 21 is a view similar to Fig. 20 showing a modification thereof.

When the unit above described is conditioned for maximum outward spreading of the air delivered as is desirable in most cooling installations, warmer room air is aspirated effectually into the center of the conical air stream 34 as indicated by the arrows 36 in Fig. 4 and sweeps across the surface of the plate 22. Frequently this results in the condensation of moisture on the plate or objectionable discoloration thereof by the accumulation of the dust particles carried in the air. I have discovered that such smudging may be avoided by a simple adjustment of the deflector 27 shown in Fig. 5 or a construction of the latter to prevent the aspirated room air from coming into direct contact with the surface of the face plate. This may be accomplished by providing in the otherwise closed area of the deflector, a multiplicity of holes well distributed over the central deflecting area and correlated in size with the velocity of the air flowing through the unit so as to cause small streams or jets of the air, indicated at 77 in Fig. 19, to be discharged through the face plate and beyond the latter a short distance sufficient to block the aspirated stream and prevent it from coming into contact with the plate surface. For the flow rates commonly used in room cooling systems, the desired blocking action is achieved when the deflecting area is perforated by closely spaced holes 75 about ¹⁄₁₆ of an inch in diameter as compared to 3/16 of an inch for the holes 25 in the outer or uncovered portion of the face plate. Preferably, the total flow through the restricted holes is on the order of 5 to 10 percent of the total air delivered through the inlet 11.

Where the deflector 27ª is formed as a separate plate lying against a face plate perforated by the holes 25 over its entire area, the restricted holes 75 are spaced to correspond to the holes 25 as shown in Fig. 20. By means of a clamping bolt or rivet 76, the deflector may be held against the face plate 22 with the holes 75 in register with the holes 25. Or, if the deflector is an integral part of the face plate 22 as shown in Fig. 21, the larger holes may be punched in the outer peripheral portion while the central or deflector area is perforated by the smaller holes. With the face plate and deflector constructed as shown in Figs. 1 to 5 to provide for varying the air discharge pattern in service, the restricted flow through the deflector area may be achieved by a simple adjustment of the deflector to bring the desired area of the holes 25 and 26 into register. For this purpose and in order to achieve the required degree of restriction, the holes in the deflector may be shaped or spaced nonuniformly as contrasted with the equal sizing and spacing shown in Fig. 5.

It will be apparent that the air distribution unit in all of the forms above described is relatively simple and economical in construction and at the same time presents a neat and artistic apearance that blends well into various kinds of room wall or ceiling constructions. The unit is extremely versatile in its adaptability to the many different operating conditions that may be encountered in service. That is to say, it may be adjusted easily to vary the air discharge pattern, the length of its throw, the volume of air delivered, and the number of directions of discharge. Or various peripheral shapes of the discharged air stream may be achieved by correlating the size and shape of the deflector area with that of the inlet 11 and the outlet 9. The devices through which the service adjustments are made may all be mounted on and concealed within the unit itself and are conveniently accessible for adjustment either by moving a small projecting knob or by inserting a simple tool through the perforations of the face plate.

By a simple variation in construction the unit may be adapted for use in installations where objectionable discoloration or smudging of the outer surface of the face plate would occur.

This application is a continuation-in-part of my copending application Serial No. 230,038, filed June 5, 1951, now abandoned.

I claim as my invention:

1. An air distribution unit having, in combination, a hollow casing adapted for the flow of air axially therethrough and forming an inlet at one end and an outlet at the other end, said outlet having an area at least four times the free area of said inlet, a face plate less than .035 of an inch thick covering said outlet and having closely spaced perforations therethrough distributed over substantially the full area of the outlet and having a combined free area between 35 and 55 percent of the total area of the outlet, and a deflector member, means on said casing supporting said member adjacent said face plate and opposite the inlet to intercept part of the air stream flowing through said inlet, the total area of said deflector member being less than the full area of said inlet.

2. An air distribution unit having, in combination, a hollow casing defining at one end an inlet and at the other end an outlet, said outlet having an area substantially greater than the free area of said inlet, a thin face plate covering said outlet and having perforations therethrough distributed over the full area of the outlet and having a combined free area between 35 and 55 percent of the total area of the outlet, a deflector member, and means supporting said deflector adjacent said face plate and opposite the inlet to intercept part of the air stream flowing through said inlet, the total area of said deflector member being less than the full area of said inlet.

3. An air distribution unit having, in combination, a hollow casing defining at one end an inlet and at the other end an outlet, said outlet having an area substantially larger than the free area of said inlet, a thin face plate covering said outlet and having perforations therethrough alternating with imperforate areas and having a combined free area approximating half the total area of the outlet, and a deflector member of smaller area than said inlet disposed adjacent said face plate and opposite the inlet to intercept part of the air stream flowing through the inlet, and means supporting said member for movement thereof relative to said plate to uncover varying areas of the perforations in the plate.

4. An air distribution unit having, in combination, a hollow casing defining at opposite ends an inlet and an outlet, a perforated face plate covering said outlet, a deflector member disposed within said casing adjacent said face plate and opposite the inlet to intercept part of the air stream flowing through said inlet, said member having apertures therethrough and being movable relative to said plate to vary the air flow through the covered portion of the plate, a thermostatic actuator disposed within said casing and expansible and contractible with changes in the temperature of the air flowing therethrough, and mechanism connecting said deflector member and said actuator for movement of the member thereby to vary the degree of uncovering of said perforations in accordance with said temperature changes.

5. An air distribution unit having, in combination, a hollow casing defining at opposite ends an inlet and an outlet, a perforated face plate covering said outlet, a deflector member disposed within said casing adjacent said face plate and opposite the inlet to intercept part of the air stream flowing through said inlet, said member having apertures therethrough and being movable relative to said plate to vary the air flow through the covered portion of the plate, and means responsive to changes in the condition of the air delivered through said casing to shift said deflector member and vary the degree of uncovering of the perforations in the covered portion of said plate.

6. An air distribution unit having, in combination, a hollow casing having an inlet at one end and a larger outlet at the other end, a collar smaller than said inlet defining an air passage extending along the axis of said casing and mounted at the outlet end thereof to turn about said axis, a perforated plate surrounding said collar and covering the larger end of said outlet, and a movable deflector ring surrounding said collar adjacent said plate and overlapping the inner edge portion of the latter, said ring having apertures therethrough adapted for different degrees of register with the perforations of said plate.

7. An air distribution unit having, in combination, a hollow casing having an inlet at one end defined by flat sides paralleling the casing axis and an outlet at the other end with flat walls merging with said inlet sides and flaring outwardly, a perforated face plate covering the larger end of said outlet, a deflector member covering the central portion of said face plate and adapted to intercept part of the air stream flowing from said inlet, and a plurality of baffles each hinged on said casing along the junction of one of said sides and walls to swing between an outer inactive position adjacent said wall and an active position overlying the edge of said deflector member whereby to reduce the outward spreading of the air from the corresponding side of said outlet.

8. An air distribution unit having, in combination, a hollow casing having an inlet at one end defined by flat sides paralleling the casing axis and an outlet at the other end with flat walls merging with said inlet sides and flaring outwardly, a deflector member smaller than said inlet, means on said casing adjacent the larger end of said outlet supporting said member to intercept part of the air stream flowing through the casing from the inlet, and a plurality of baffles hinged on said casing along the junctions of said sides and walls and swingable into positions overlying the edge of said deflector member whereby to reduce the outward spreading of the air leaving the corresponding sides of said outlet.

9. An air distribution unit having, in combination, a hollow casing having an inlet at one end and an outlet larger than said inlet at the other end, a deflector smaller than said inlet, means on said casing supporting said deflector in said outlet in a position to intercept part of the air stream flowing through the casing whereby to effect lateral spreading of the tubular air stream discharged from the periphery of said outlet, and a baffle hinged at the side wall of said casing to swing into positions overlying the edge of said deflector whereby to reduce the outward spreading of the air from one side of said outlet.

10. An air distribution unit having, in combination, a hollow casing having an inlet end of a rectangular cross section and an outlet larger than said inlet at the other end, vanes of trapezoidal shape hinged at their longer side edges on the sides of said inlet end and adapted, when swung into a plane normal to the casing axis to form miter junctions at the adjacent ends of adjacent vanes, the shorter side edges of said vanes cooperating to define an inlet, a deflector member of smaller area than said outlet, and means on said casing mounting said member opposite said inlet and in the path of the air stream delivered therethrough.

11. An air distribution unit having, in combination, a hollow casing adapted for the flow of air axially therethrough and having an inlet at one end and an outlet at the other end, said outlet being polygonal in shape and substantially larger in area than said inlet, a thin face plate covering said outlet and having perforations therethrough, and a deflector member smaller than said inlet adjacent said face plate and covering the central portion of the face plate to control the flow of air through said central portion, the periphery of said member being rounded to space the corners of said outlet farther from the member than the remaining portions of the outlet.

12. An air distribution outlet having, in combination, a tubular casing having an inlet at one end and flaring axially toward and terminating at the other end in an outlet of rectangular cross section and of an area substantially larger than the smallest cross section of said inlet, a deflector of an area substantially smaller than said inlet and paralleling and disposed adjacent the plane of said outlet to intercept part of the air stream flowing through said inlet and deflect such air laterally and outwardly, and a thin plate disposed in said plane and covering said outlet and perforated in the area surrounding said deflector by closely spaced holes permitting the air flowing therethrough to be diverted by said deflected air and discharged from said outlet at a small angle relative to said plane, said inlet being circular in cross section and said deflector having a rectangular periphery with the sides thereof inclined relative to the side edges of said outlet.

13. An air distribution outlet having, in combination, a tubular casing having an inlet at one end and flaring axially toward and terminating at the other end in an outlet of rectangular cross section and of an area substantially larger than the smallest cross section of said inlet, a deflector of an area substantially smaller than said inlet and paralleling and disposed adjacent the plane of said outlet to intercept part of the air stream flowing through said inlet and deflect such air laterally and outwardly, and a thin plate disposed in said plane and covering said outlet and perforated in the area surrounding said deflector by closely spaced holes permitting the air flowing therethrough to be diverted by said deflected air and discharged from said outlet at a small angle relative to said plane, said inlet being rectangular in cross section and said deflector comprising a substantially circular disk approximately centered in said outlet.

14. An air distribution outlet having, in combination, a tubular casing having an inlet at one end and flaring axially toward and terminating at the other end in an alined outlet of an area substantially larger than the smallest cross section of said inlet, and a thin plate covering said outlet and carrying a deflector of substantially smaller area than said inlet and disposed opposite the latter to intercept part of the air stream flowing through said inlet and deflect such air outwardly and laterally across the surrounding area of said plate, the latter area being perforated by closely spaced holes permitting the air flowing therethrough to be diverted outwardly by said deflected air and discharged from said plate at a small angle relative to the plane thereof and the total area of the uncovered holes surrounding said deflector area being larger than the area of said inlet.

15. An air distribution outlet having, in combination, a tubular casing having an inlet at one end and flaring axially toward and terminating at the other end in an outlet of an area substantially larger than the smallest cross section of said inlet, and a thin plate covering said outlet and carrying a deflector of substantially smaller area than said inlet and disposed opposite the latter to intercept part of the air stream flowing through said inlet and deflect such air outwardly and laterally across the surrounding area of said plate, the latter area being perforated by closely spaced holes permitting the air flowing therethrough to be diverted outwardly by said deflected air and discharged from said plate at an angle relative to the plane thereof, said holes occupying more than 35 percent of the uncovered area of the plate around the deflector.

16. An air distribution outlet having, in combination, a tubular casing having an inlet at one end and flaring axially toward and terminating at the other end in an outlet of rectangular cross section and of an area substantially larger than the smallest cross section of said inlet, and a plate approximately .035 of an inch thick covering said outlet and carrying a deflector of substantially smaller area than said inlet and disposed opposite the latter to intercept part of the air stream flowing through said inlet and deflect such air outwardly and laterally across the surrounding area of said plate, the latter area being perforated by closely spaced holes permitting the air flowing therethrough to be diverted outwardly by said deflected air and discharged from said plate at an angle relative to the plane thereof, said holes occupying more than 35 percent of the uncovered area of the plate around the deflector.

17. An air distribution outlet having, in combination, a tubular casing having an inlet at one end and flaring axially toward and terminating at the other end in an alined outlet of an area substantially larger than the smallest cross section of said inlet, and a thin plate covering said outlet and carrying a deflector of substantially smaller area than said inlet and disposed opposite the latter to intercept part of the air stream flowing through said inlet and deflect such air outwardly and laterally across the surrounding area of said plate, the latter area being perforated by closely spaced holes permitting the air flowing therethrough to be diverted outwardly by said deflected air and discharged from said plate at a small angle relative to the plane thereof and the total area of the uncovered holes surrounding said deflector area being larger than the area of said inlet, said deflecting area of said plate being perforated by closely spaced holes substantially smaller than said first mentioned holes and permitting a small fraction of the intercepted air to be discharged through the plate normal thereto and over a short range of throw whereby to oppose the flow of aspirated room air into direct contact with the outer surface of said face plate.

18. An air distribution unit having, in combination, a hollow casing adapted for the flow of air axially therethrough and having an inlet at one end and an outlet at the other end, said outlet being substantially larger in area than said inlet, a thin face plate covering said outlet and having perforations therethrough, and an apertured deflector member smaller in area than said inlet covering the central portion of said face plate and mounted adjacent said face plate for movement relative to the plate to bring the perforations in the plate and the apertures in the member into and out of register thereby to control the flow of air through the central portion of the plate, the perforations in the remaining outer peripheral portion of the plate being uncovered.

References Cited in the file of this patent

UNITED STATES PATENTS

| | | |
|---|---|---|
| 282,977 | Gallentine | Aug. 14, 1883 |
| 791,397 | Asbury | May 30, 1905 |
| 2,059,715 | Stacey et al. | Nov. 3, 1936 |